United States Patent [19]

Bartlett et al.

[11] Patent Number: 4,928,192

[45] Date of Patent: May 22, 1990

[54] PROCESS FOR IDENTIFYING DISKS AND AUTOMATICALLY CONFIGURING A DISK DRIVE SYSTEM

[75] Inventors: Kenneth G. Bartlett; Per-Erik Walberg, both of San Jose, Calif.

[73] Assignee: Konica Corporation, Tokyo, Japan

[21] Appl. No.: 137,804

[22] Filed: Dec. 23, 1987

[51] Int. Cl.⁵ .................... G11B 5/596; G11B 5/09
[52] U.S. Cl. .................. 360/77.08; 360/39; 360/48; 360/51; 360/69; 360/77.02
[58] Field of Search .............. 360/18, 27, 48, 51, 360/69, 78, 61, 31, 39, 77, 77.02, 77.04, 77.05, 77.08, 78.04, 78.14; 369/47, 48, 53, 54, 58

[56] References Cited

U.S. PATENT DOCUMENTS

| | | | |
|---|---|---|---|
| 4,149,199 | 4/1979 | Chick et al. | 360/77.04 |
| 4,479,210 | 10/1984 | Nakayama | 369/261 |
| 4,564,930 | 1/1986 | Funabashi et al. | 369/270 |
| 4,597,018 | 6/1986 | Sonobe et al. | 358/296 |
| 4,644,418 | 2/1987 | Banno et al. | 360/48 |
| 4,644,419 | 2/1987 | Iinuma et al. | 360/51 |
| 4,651,238 | 3/1987 | Ishikura | 360/48 |
| 4,686,661 | 8/1987 | Isaka | 369/13 |
| 4,706,232 | 11/1987 | Funada et al. | 369/13 |
| 4,740,937 | 4/1988 | Watanabe | 369/13 |
| 4,748,606 | 5/1988 | Naito et al. | 360/114 |

FOREIGN PATENT DOCUMENTS

| | | |
|---|---|---|
| 0135969 | 3/1985 | European Pat. Off. . |
| 0167879 | 1/1986 | European Pat. Off. ........... 360/78 |
| 0180459 | 8/1986 | European Pat. Off. . |
| 0192470 | 8/1986 | European Pat. Off. . |
| 3342525 | 5/1984 | Fed. Rep. of Germany . |
| 59-94242 | 5/1984 | Japan .................... 360/75 |
| 60-1664 | 1/1985 | Japan .................... 360/69 |
| 60-147949 | 8/1985 | Japan .................... 360/114 |
| 60-254459 | 12/1985 | Japan .................... 360/48 |
| 61-96540 | 5/1986 | Japan .................... 360/114 |
| 61-278058 | 12/1986 | Japan .................... 360/114 |
| 1466809 | 3/1977 | United Kingdom . |
| 2106696 | 4/1983 | United Kingdom . |
| 2117162 | 10/1983 | United Kingdom . |
| 2127205 | 4/1984 | United Kingdom . |
| 2132807 | 7/1984 | United Kingdom . |
| 2152267 | 7/1985 | United Kingdom . |

Primary Examiner—Aristotelis M. Psitos
Assistant Examiner—Steven R. Garland
Attorney, Agent, or Firm—Thomas E. Schatzel

[57] ABSTRACT

A process for identifying disks and automatically configuring a disk drive system to any one of a variety of disk patterns as embedded in firmware in a controller of a disk drive system. The process distinguishes between embedded servo and nonembedded servo disks by searching for servo patterns on the disk. Distinction between high and low density type disks is made by reading the disks at different data rates. After the type of disk is determined, a controller is enabled to set the disk drive system in the proper mode for that type of disk. The process also enables the controller to find the disk format values on the disk, or provides the standard values for the particular type of disk if the information is not located on the disk.

18 Claims, 7 Drawing Sheets

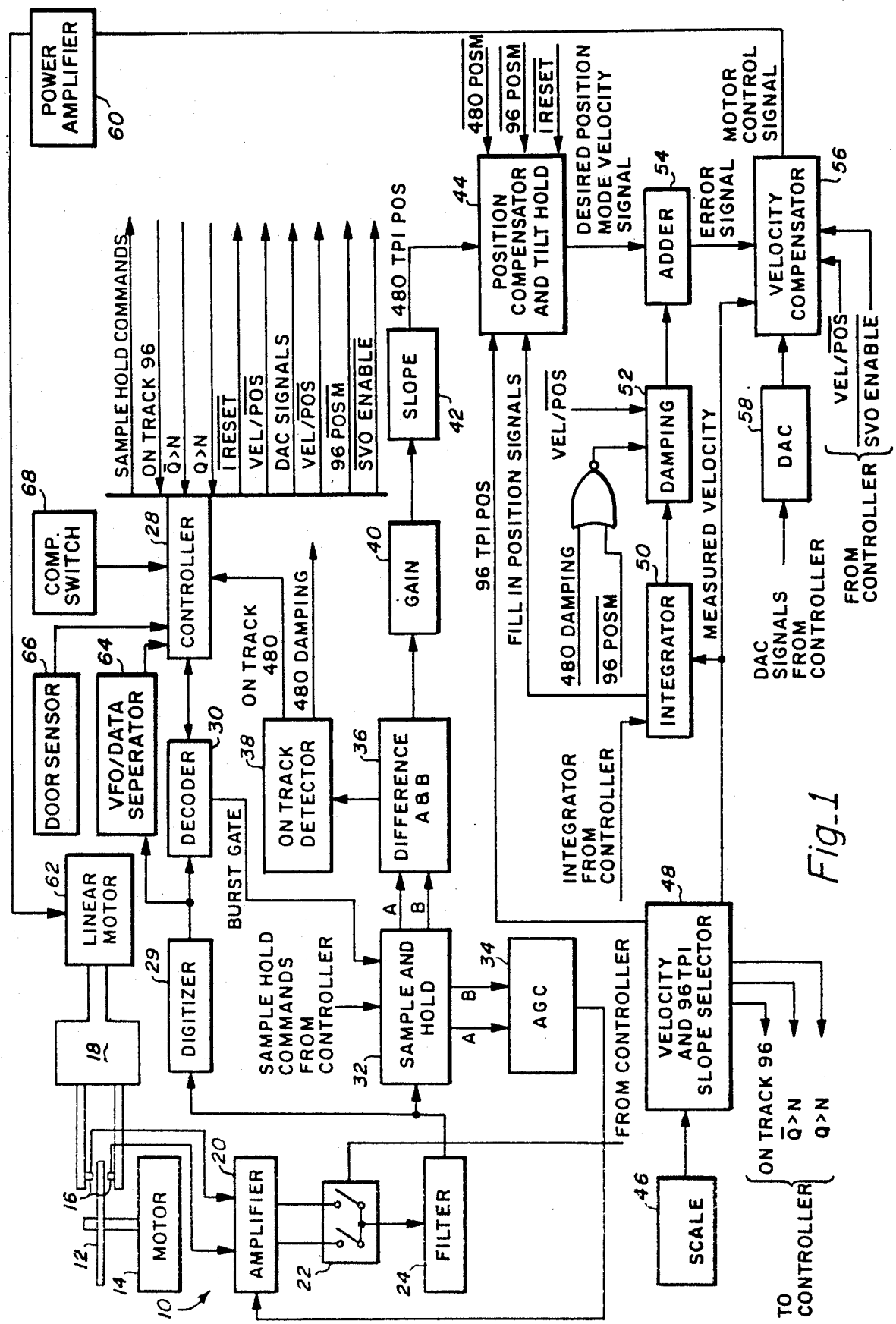
Fig_1

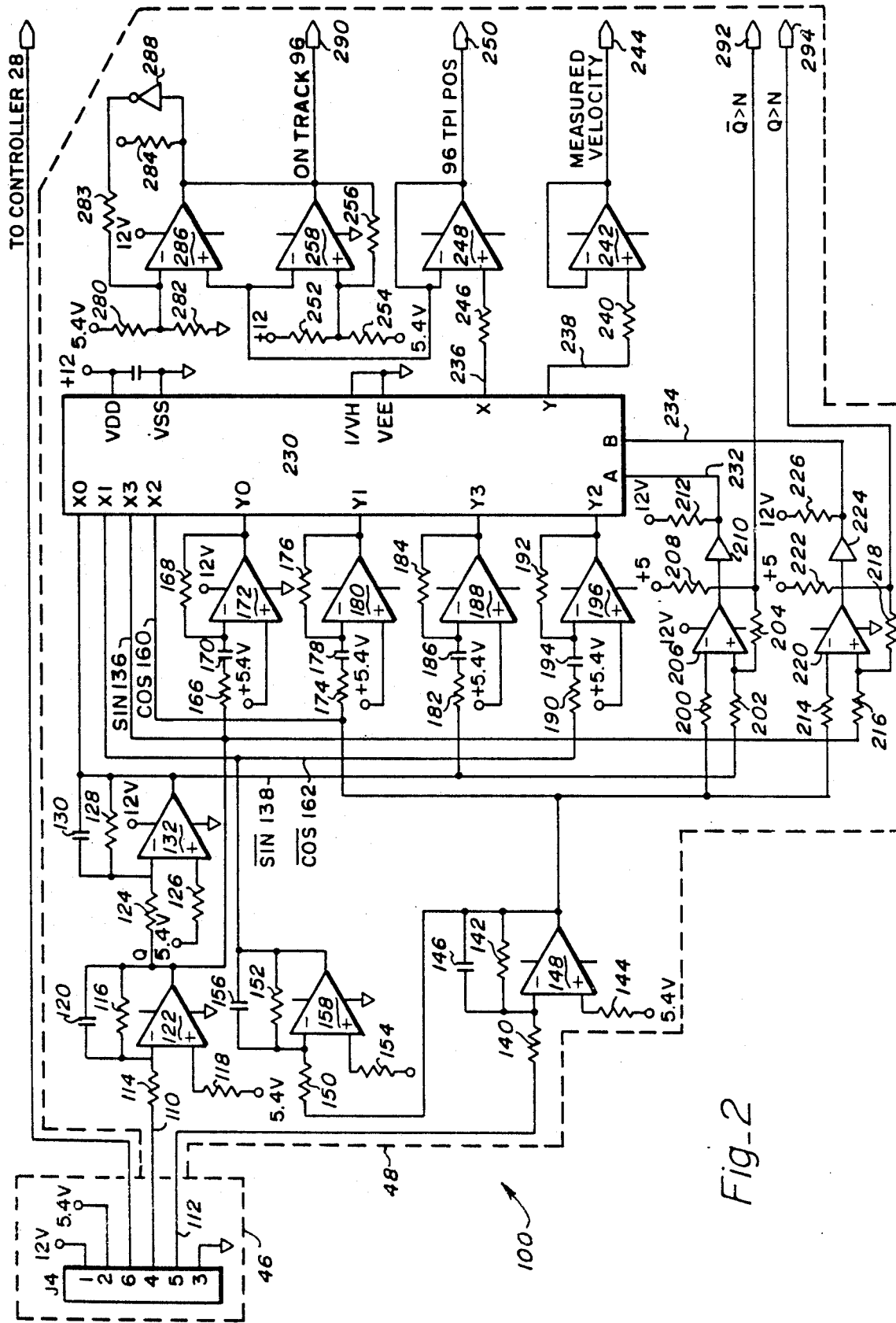
Fig_2

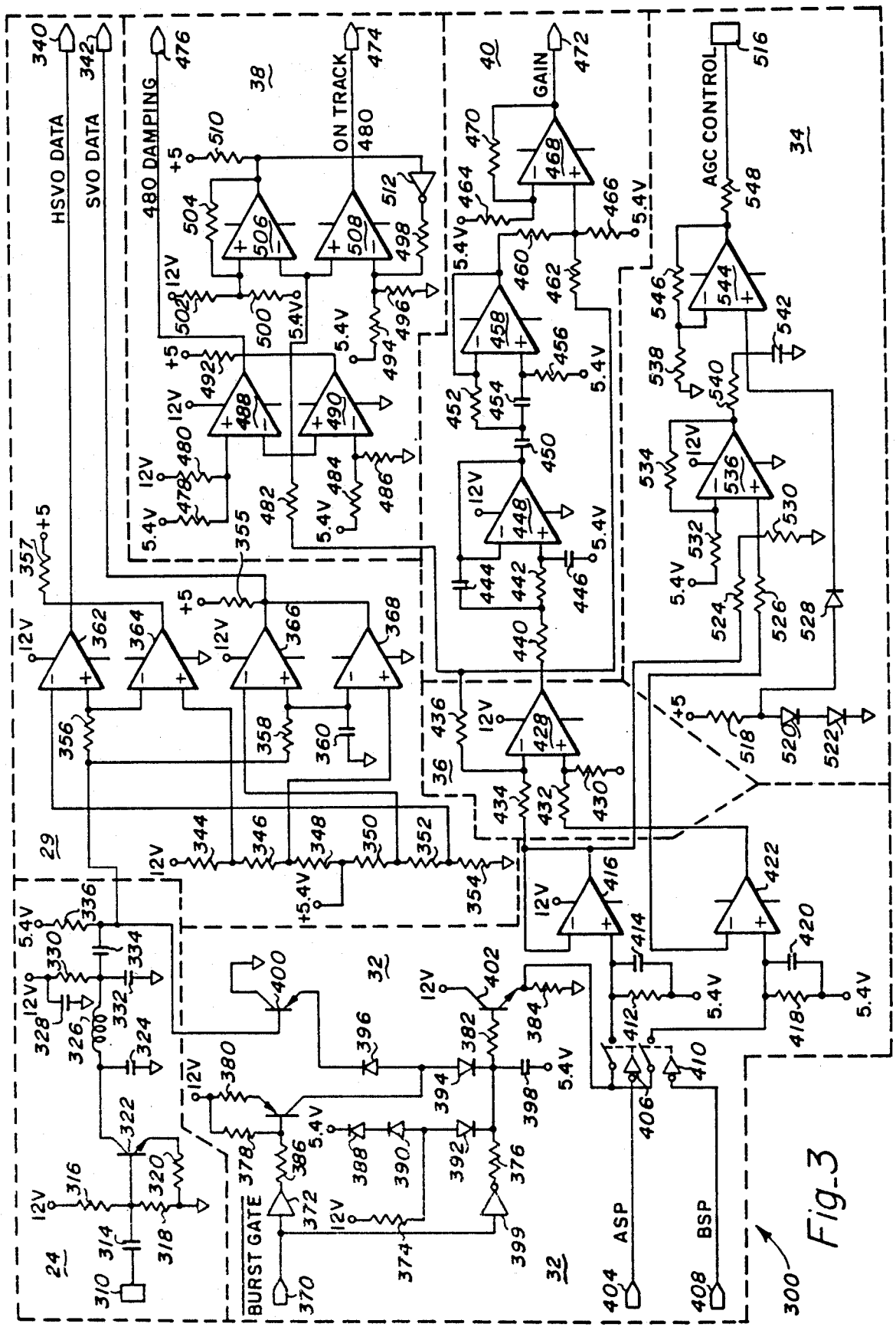
Fig_3

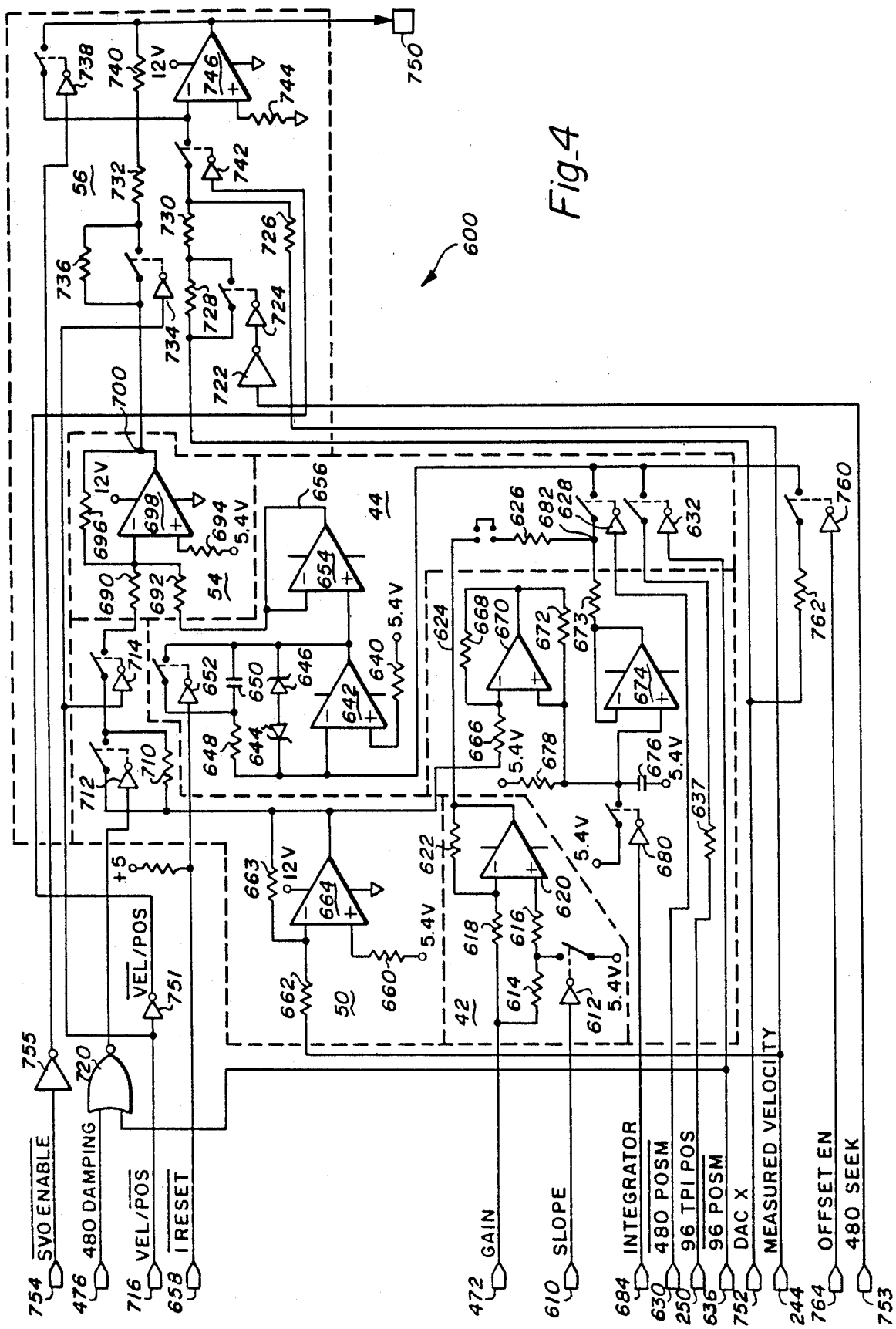
Fig_4

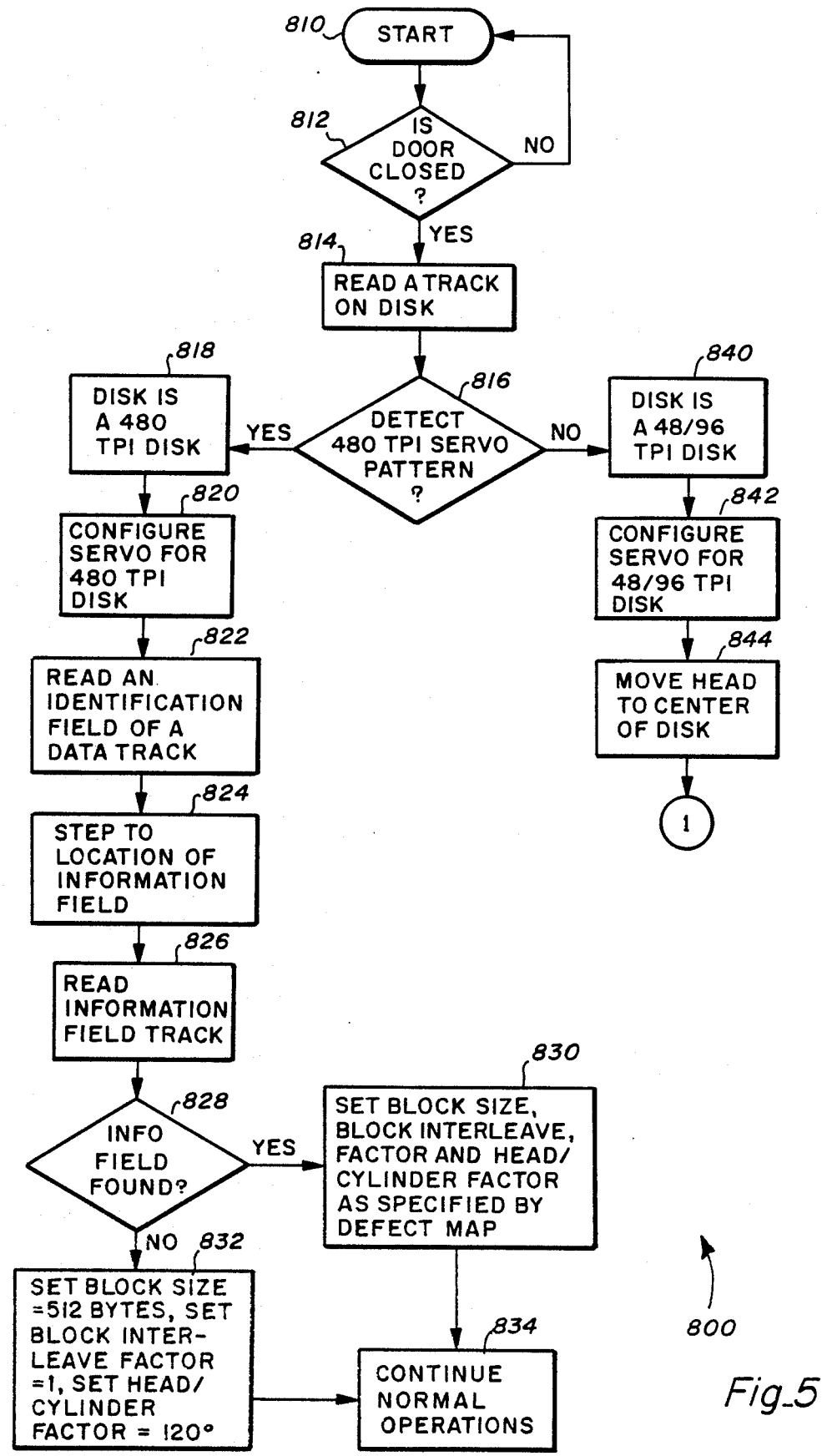
Fig_5

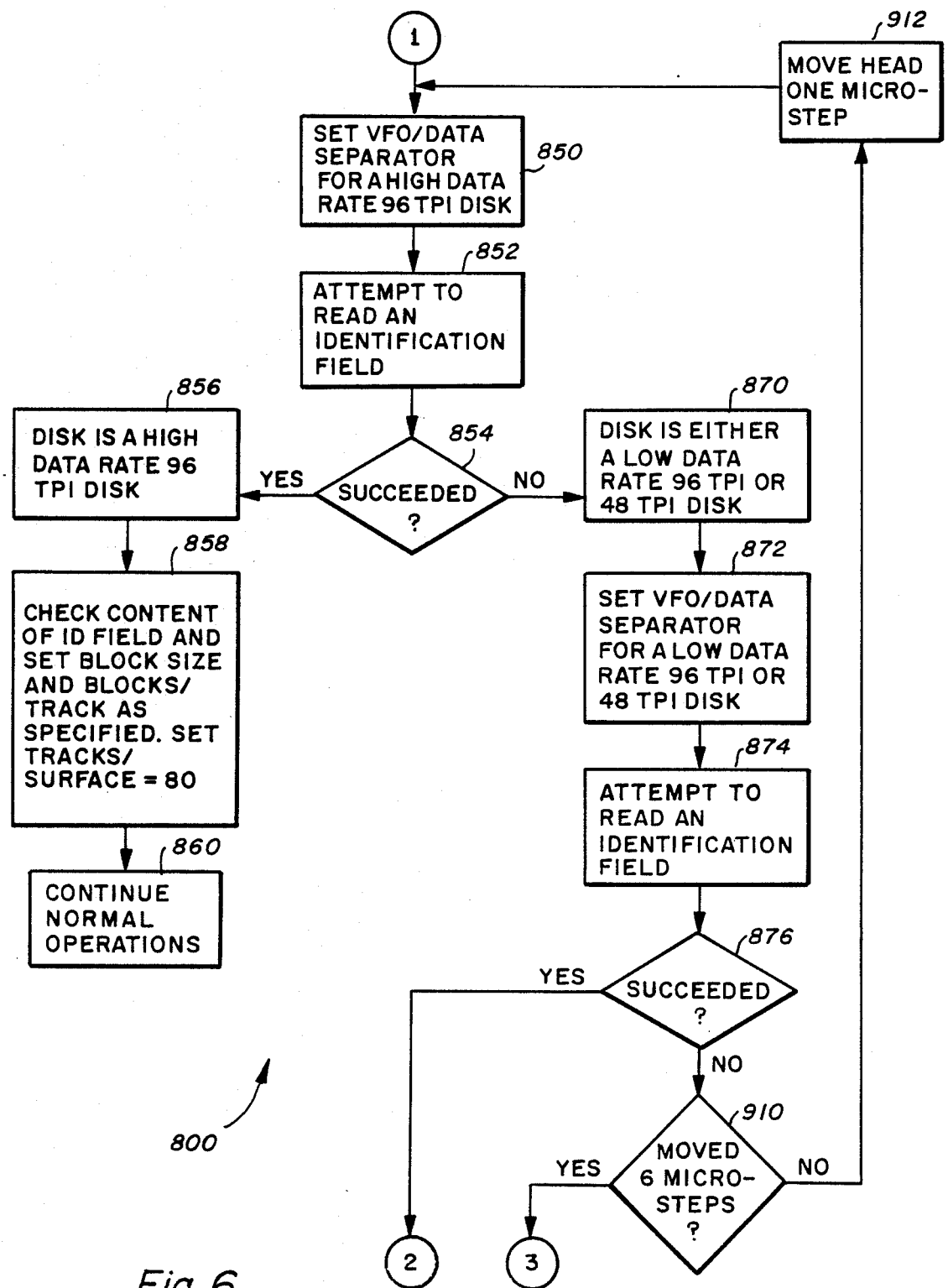
Fig_6

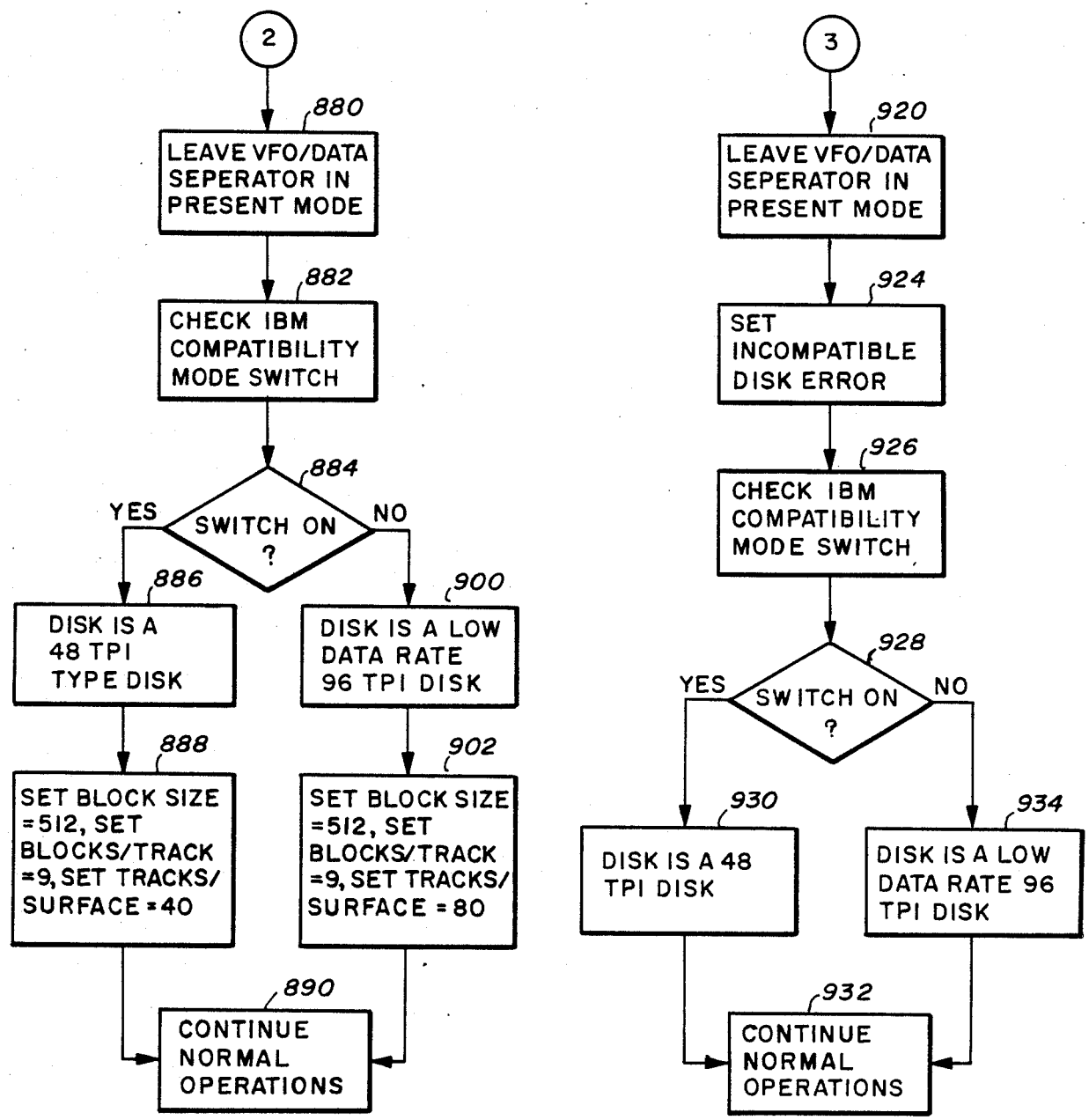
Fig_7

PROCESS FOR IDENTIFYING DISKS AND AUTOMATICALLY CONFIGURING A DISK DRIVE SYSTEM

BACKGROUND OF THE INVENTION

1. Field of the Invention

This invention relates generally to data disk drive systems and more particularly to processes for automatically configuring such systems for a variety of disk formats.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write or transducer head. The binary information is encoded on the face of the disk in concentric rings, called tracks, and the read/write head can move radially along the disk face to select a particular track to record or retrieve information. Data disks can be rigid or flexible.

The most popular type of flexible or floppy disk is the 5¼ inch size floppy disk. However, these disks may be formatted in several different ways. The IBM PC AT or comparable computer generally uses a 5¼ inch floppy disk which is formatted at a track density of ninety-six tracks per inch (TPI). The IBM PC AT uses high data rate ninety-six TPI disks which are formatted at five hundred Kbits/sec at three hundred sixty rpm. Another type of ninety-six TPI disk by NEC is a low data rate ninety-six TPI disk and is formatted at two hundred fifty Kbits/sec at three hundred rpm. Older computers, such as the IBM XT PC use 5¼ inch floppy disks formatted at forty-eight TPI. The IBM PC AT disk drive is able to distinguish between the high data rate ninety-six TPI disk and the older forty-eight TPI disk.

Recently, Konica Technology, Inc. has developed a 5¼ inch floppy disk which has embedded servo data and is formatted at four hundred eighty TPI. A more detailed description of this four hundred eighty TPI disk and disk drive system is given in U.S. Pat. No. 4,825,310, issued April 25, 1989 and U.S. Pat. No. 4,724,370, issued February 9, 1988. There is a need for a process for enabling a disk drive to automatically configure itself to these and/or other various 5¼ inch floppy disk formats.

SUMMARY OF THE PRESENT INVENTION

It is an object of the present invention to provide a process for identifying the format of a disk placed inside a disk drive.

It is another object of the present invention to provide a process for automatically configuring a disk drive system to any of a variety of disk formats.

Briefly, in a preferred embodiment, the present invention provides a process for identifying a data disk format and automatically configuring a disk drive system comprising the steps of: (a) reading a track on a disk; (b) if a servo pattern is detected, then identifying the disk as a four hundred eighty TPI disk, configuring the servo system for such a disk, reading an identification field, stepping to an information block, reading the information block and configuring the controller as specified in the information block; (c) if a servo pattern is not detected, then configuring the servo system for a forty-eight or ninety-six TPI disk, moving the head to the center of the disk, setting a data separator to a mode corresponding to a disk formatted at five hundred Kbyte per second at three hundred sixty rpm and attempting to read an identification field; (d) if the identification field is successfully read in step (c), then identifying the disk as a high data rate ninety-six TPI disk, and configuring the controller as specified in the identification field; (e) if the identification field is not successfully read, then identifying the disk as a low data rate ninety-six TPI disk or a forty-eight TPI disk, setting the data separator to a mode corresponding to a disk formatted at two hundred fifty Kbyte per second at three hundred rpm and attempting to read an identification field; (f) if the identification field is successfully read in step (e), then checking a compatibility switch; (g) if the compatibility switch is on, then identifying the disk as an IBM XT type forty-eight TPI disk and configuring the controller as appropriate; and (h) if the compatibility switch is not on, then identifying the disk as an NEC type low data rate ninety-six TPI disk and configuring the controller as appropriate.

An advantage of the present invention is that it provides a process for identifying the format of a disk placed inside a disk drive.

Another advantage of the present invention is that it provides a process for automatically configuring a disk drive system to a variety of disk formats.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a circuit block diagram of a disk drive system of the present invention;

FIG. 2 is a circuit diagram of a first part of the system of FIG. 1;

FIG. 3 is a circuit diagram of a second part of the system of FIG. 1;

FIG. 4 is a circuit diagram of a third part of the system of FIG. 1;

FIG. 5 is a flow chart of a first part of the process of the present invention;

FIG. 6 is a flow chart of a second part of the process of the present invention; and FIG. 7 is a flow chart of a third part of the process of the present invention.

DETAILED DESCRIPTION OF THE PREFERRED EMBODIMENT

FIG. 1 shows a circuit diagram of the disk drive system of the present invention and is designated by the general reference number 10. A flexible or floppy data disk 12 is rotated by a motor 14. A pair of transducer heads 16 are positioned over the surface of the disk 12 and are attached to a carriage arm 18.

An amplifier 20 is connected to the transducer heads 16 and amplifies the signals from the heads 16. A switch 22 is connected to amplifier 20 and controls which head signals are to be used. A filter 24 is connected to switch 22 and provides filtering for the head signals. Switch 22 is controlled by a controller 28.

A digitizer 29 is connected to filter 24 and digitizes the analog head signals. A decoder 30 is connected to digitizer 29 and reads the digitized head signals in a servo sector of a four hundred eighty TPI disk and generates timing windows for reading the servo information. These timing windows are sent to the controller 28. A sample and hold circuit 32 is connected to filter 24 and stores the "A" and "B" servo bursts read by heads 16. An automatic gain control (AGC) 34 is connected to the sample and hold circuit 32. AGC 34 measures the intensity of the sampled "A" and "B" servo bursts and sends an AGC control signal to the amplifier 20 to adjust the gain.

A difference circuit 36 is connected to the sample and hold circuit 32 and produces a signal corresponding to the difference in intensities of the sampled "A" and "B" servo bursts. An on-track detector 38 is connected to the difference circuit 36. On-track detector 38 determines from the difference signal whether the head is on-track or not, and sends an on-track signal to controller 28.

A gain circuit 40 is connected to difference circuit 36 and modifies the gain of the difference signal to compensate for misclamping and disk imperfections. A slope circuit 42 is connected to gain circuit 40 and selects the slope of the signal from the gain circuit 40 in order to produce a four hundred eighty TPI position signal. A position compensator and tilt hold circuit 44 is connected to the slope circuit 42 and outputs a desired position mode velocity signal which also compensates for tilt.

An etched metal plate scale 46, also called a linear optical encoder, is attached to the carriage 18 and provides output signals responsive to the movement of the carriage 18. A glass scale could be used in place of the metal scale 46. A velocity and ninety-six TPI slope select circuit 48 is connected to the metal scale 46. Velocity and ninety-six TPI slope select circuit 48 produces a ninety-six TPI position signal and a measured velocity signal. An integrator 50 is connected to velocity and ninety-six TPI slope selector circuit 48 and position compensator 44 and integrates the measured velocity signal to produce a fill-in position signal. The fill-in position signal is added to the four hundred eighty TPI position signal in the position compensator 44. A damping circuit 52 is connected to the integrator 50. The damping circuit 52 damps the measured velocity signal transmitted to the adder 54 when the on-track detector 38 indicates the heads 16 are on-track. A summing amplifier or adder 54 is connected to the damping circuit 52 and the position compensator and tilt hold circuits 44 and compares the desired position mode velocity position signal to the measured velocity signal and produces an error signal.

A velocity compensator 56 is connected to the adder 54, velocity circuit 48 and a digital-to-analog converter (DAC) 58. The velocity compensator 56 produces a motor control signal and sends it to a power amplifier 60 which in turn controls a linear motor 62. Linear motor 62 is a linear voice coil motor. Linear motor 62 moves carriage 18 and determines radial position of heads 16 relative to disk 12.

A variable frequency oscillator/data separator 64 is connected between digitizer 29 and controller 28. Separator 64 enables controller 28 to read the logic data stored on the disk. A door sensor 66 is also connected to controller 28. Sensor 66 is attached to the disk drive door and sends a signal to controller 28 when the door is closed. An IBM XT type compatibility switch or jumper 68 is connected to controller 28. Switch 68 is turned on manually by the user when an IBM forty-eight TPI disk is to be used. When switch 68 is on, it sends an IBM compatibility signal to controller 28.

The operation of system 10 has three modes: a velocity or seek mode, a ninety-six TPI position mode and a four hundred eighty TPI position mode. The ninety-six TPI position mode can also be used with forty-eight TPI disks. The controller 28 merely doubles the number of tracks moved when positioning on a forty-eight TPI disk. The system 10 can thus be used with forty-eight, ninety-six and four hundred eighty TPI type disks.

The velocity or seek mode is well known in the art. The controller 28 knows the position of heads 16 on disk 12. When a new track is desired, the controller inputs a desired velocity signal to the DAC 58. The DAC 58 turns the digitized desired velocity signal into an analog signal. This desired velocity signal is then passed to the velocity compensator 56 which causes the linear motor 62 to move the heads 16.

The metal scale 46 and the velocity circuit 48 produce a measured velocity signal. The velocity compensator 56 compares the measured velocity signal with the desired velocity signal from the DAC 58. The velocity compensator 56 trys to keep the measured velocity equal to the desired velocity by adjusting the motor control signal accordingly. The rest of the circuits in the system 10 remain inactive during the seek mode.

Once the heads are on the proper track, the system 10 must keep the heads 16 on-track as the disk 12 is rotated by motor 14. This on-track function is performed by the position modes. The ninety-six TPI position mode is used when a forty-eight or ninety-six TPI disk is being used and the four hundred eighty TPI position mode is used when a four hundred eighty TPI disk is being used.

In the ninety-six TPI position mode, the velocity and ninety-six TPI slope selector 48 sends a ninety-six TPI position signal to the position compensator 44. The ninety-six TPI position signal represents the position of heads 16 on the disk 12 as measured by the metal scale 46. The position compensator 44 sends a desired position mode velocity signal to the adder 54. The adder 54 compares the desired position mode velocity signal with the measured velocity signal and tries to keep them equal by outputting the proper error signal. The adder 54 passes the error signal to the velocity compensator 56. The velocity compensator 56 outputs the motor control signal to the power amp 60 and the linear motor 62.

When a four hundred eighty TPI disk is used, the tracks are much closer together and keeping the heads 16 on-track becomes more difficult. A metal scale position signal, as used in the ninety-six TPI position mode, is not accurate enough to use in a four hundred eighty TPI disk. Therefore, the four hundred eighty TPI position mode of the system uses a periodic sampling of servo sector information.

In the four hundred eighty TPI position mode, the sample and hold circuit 32 receives and stores the "A" and "B" servo bursts which are read from the servo pattern on disk 12. The burst gate timing windows needed to read the bursts are provided by decoder 30. The difference circuit 36 determines the difference in intensity of the "A" and "B" bursts. The gain circuit 40 modifies the signal from the difference circuit 36 to compensate for misclamping and disk imperfections. The slope circuit 42 selects the slope of the signal and produces a four hundred eighty TPI position signal. The position compensator 44 modifies the four hundred eighty TPI position signal and produces a desired position mode velocity signal.

When a servo sector is being read, the integrator 50 is disabled and the fill-in position signal is zero. The desired position mode velocity signal from the position compensator 44 is thus equivalent to the four hundred eighty TPI position signal. The adder 54 compares the measured velocity and the desired position mode velocity signal from the position compensator 44 and produces an error signal. The velocity compensator 56 produces a motor control signal which goes to motor 62 via power amplifier 60. The motor moves the heads 16 to keep them on track.

When the heads 16 are between servo sectors, the servo system 10 is unable to receive position information from the disk 12. Older disk drive systems try to hold the head on-track between servo samples based on the information stored from the last servo sector which was read. The present system is able to produce a position signal between servo sectors. The integrator 50 is used to intergrate the measured velocity signal to produce a fill-in position signal. This fill-in position signal is passed to the position compensator 44 and is there added to the four hundred eighty TPI position signal of the last servo sector which was read. The sample position signal is derived from the "A" and "B" burst signals from the preceding servo sector reading and is stored in the sample and hold circuit 32. Thus, the integrator 50 gives the system 10 position information between servo sector samples and allows accurate adjustment of the head position between samples. This integrated velocity position signal is a unique way to supplement the position information from the servo sectors and provides a more accurate way to keep the heads on-track.

FIG. 2 shows a circuit diagram of a first part of the system 10 of FIG. 1 and is designated by the general reference number 100. Part 100 includes the metal scale 46 and the velocity and ninety-six TPI slope selector 48. The metal scale 46 measures movement of the heads 16. When the heads 16 are positioned over the first track of the disk 12, the metal scale puts out a track zero signal to controller 28. The metal scale produces a pair of signals which are two triangular waves in quadrature (90° apart) and are hereinafter referred to as a sine wave and cosine wave, respectively. The metal scale produces the sine wave signal on a line 110 and the cosine wave signal on a line 112. The sine and cosine waves represent the position of the heads 16 on disk 12.

The sine wave on line 110 is passed through a buffer network comprised of a resistor 114, a resistor 116, a resistor 118, a capacitor 120, and an amplifier 122. The buffered sine wave is then passed through an inverting network comprised of a resistor 124, a resistor 126, a resistor 128, a capacitor 130, and an amplifier 132. The resulting buffered sine and inverted sine waves are output on a line 136 and 138, respectively.

The cosine wave on line 112 is passed through a buffer network comprised of a resistor 140, a resistor 142, a resistor 144, a capacitor 146, and an amplifier 148. The buffered cosine wave is then passed through an inverting network comprised of a resistor 150, a resistor 152, a resistor 154, a capacitor 156, and an amplifier 158. The resulting buffered cosine and inverted cosine waves are output on a line 160 and 162, respectively.

The sine wave from line 136 is differentiated by a differentiating network comprised of a resistor 166, a resistor 168, a capacitor 170, and an amplifier 172. The cosine wave from line 160 is differentiated by a differentiating network comprised of a resistor 174, a resistor 176, a capacitor 178 and an amplifier 180. The inverse sine wave from line 138 is differentiated by a differentiating network comprised of a resistor 182, a resistor 184, a capacitor 186, and an amplifier 188. The inverse cosine wave from line 162 is differentiated by a differentiating network comprised of a resistor 190, a resistor 192, a capacitor 194, and an amplifier 196.

The cosine wave from line 160 and the sine wave from line 138 are digitized by a network comprised of a resistor 200, a resistor 202, a resistor 204, an amplifier 206, a resistor 208, an amplifier 210, and a resistor 212. The sine wave from line 136 and the cosine wave from line 160 are digitized by a network comprised of a resistor 214, a resistor 216, a resistor 218, an amplifier 220, a resistor 222, an amplifier 224, and a resistor 226.

A double four-to-one multiplexer 230 provides wave selection for both the measured velocity and ninety-six TPI position signals. The multiplexer 230 receives binary signals along a line 232 and a line 234. The two binary signals represent four possible combinations representing one of the four waves. The multiplexer 230 receives the sine, cosine, inverse sine and inverse cosine waves along lines 136, 160, 138 and 162, respectively. The multiplexer 230 has internal switches which switch one of the four waves to a line 236. The wave selected is the one which is not at a peak and is determined by the binary information along lines 232 and 234.

The multiplexer 230 also receives the differentiated sine, cosine, inverted sine and inverted cosine waves. The multiplexer 230 internally selects one of the four waves based upon the binary information from lines 232 and 234 and outputs the selective wave on a line 238. This wave is passed through a buffer comprised of a resistor 240 and an amplifier 242 and is output as the measured velocity signal at a point 244.

The signal on line 236 is passed through a buffer comprised of a resistor 246 and an amplifier 248. The resulting signal is output at a point 250 as the ninety-six TPI position signal. The ninety-six TPI position signal is also passed through a ninety-six TPI on-track detector. The detector includes a high voltage comparator comprised of a resistor 252, a resistor 254, a resistor 256, and an amplifier 258 and a low voltage comparator comprised of a resistor 280, a resistor 282, a resistor 283, a resistor 284, an amplifier 286 and a diode 288. If the ninety-six TPI signal is between a predetermined high and low voltage, then a positive signal is output at a point 290 indicating that the heads 16 are on-track in the ninety-six TPI position mode. This signal then goes to controller 28. The signals on a line 292 and a line 294 are used by controller 28 to detect track crossings.

FIG. 3 is a circuit diagram of part of the system 10 and is designated by the general reference number 300. A point 310 receives the servo information read by heads 16 from switch 22. The servo information is filtered by filter 24. Filter 24 is comprised of a capacitor 314, a resistor 316, a resistor 318, a resistor 320, a transistor 322, a capacitor 324, an inductor 326, a capacitor 328, a resistor 330, a capacitor 332, a capacitor 334, and a resistor 336.

The digitizer 29 receives the servo information from filter 24 and digitizes the signal for the decoder 30. The digitizer 29 puts out a high threshold signal to a point 340 and a low threshold signal to a point 342. The decoder 30 uses the high threshold signal from point 342 when reading the synchronization servo information used for generating timing windows. An example of a decoder and servo pattern is described in U.S. Pat. No. 4,825,310 issued April 25, 1989. The high threshold signal insures that interference signals are screened out. When the decoder 30 reads the "A" and "B" servo bursts, it uses the low threshold signal at point 342. This is because one of the "A" or "B" bursts will be smaller than the other. In order for the servo signal to produce a digitized signal from digitizer 29, a lower threshold must be used. The digitizer 29 is comprised of a plurality of resistors 344, 346, 348, 350, 352, 354, 356, and 358, a capacitor 360, an amplifier 362, an amplifier 364, an amplifier 366, and an amplifier 368.

The sample and hold circuit 32 receives the timing windows for reading the "A" and "B" sample bursts from a point 370. Timing windows, also called a burst gate, from point 370 controls a switching network. The switching network allows the servo information to pass from the filter 24 to the sample and hold circuit 32 during reading of the servo bursts. The switching network is comprised of a buffer 372, a plurality of resistors 374, 376, 378, 380, 382, 384, and 386, a plurality of diodes 388, 390, 392, 394, and 396, a capacitor 398, an inverter 399, a transistor 400, and a transistor 402.

A point 404 receives an "A" sample signal which controls a switch 406. A point 408 receives a "B" sample signal which controls a switch 410. A network comprised of a resistor 412, a capacitor 414, and an amplifier 416 is used to hold the "A" servo burst signal. A network comprised of a resistor 418, a capacitor 420, and an amplifier 422 is used to hold the "B" servo burst signal. Controller 28 controls switch 406 when an "A" servo burst is being read and closes switch 410 when a "B" servo burst is being read.

Difference circuit 36 receives the "A" and "B" bursts from the sample and hold circuit 32 and determines the difference between the two signals. Difference circuit 36 is comprised of an amplifier 428 and a plurality of resistors 430, 432, 434, and 436.

The gain circuit 40 receives the difference signal from difference circuit 36. The gain circuit 40 boosts the gain of the signal to compensate for imperfections in the disk. An off-center disk has a ten hertz error and a noncircular disk has a twenty hertz error for speeds of six hundred rpms. The gain circuit 40 boosts the gain from ten to twenty hertz without increasing the amplitude or effecting the phase margin of the difference signal. The gain circuit 40 has a low pass filter comprised of a resistor 440, a resistor 442, a capacitor 444, a capacitor 446, and an amplifier 448. A high pass filter is comprised of a capacitor 450, a resistor 452, a capacitor 454, a resistor 456, and an amplifier 458. A summing network is comprised of a resistor 460, a resistor 462, a resistor 464, a resistor 466, an amplifier 468 and a resistor 470. The resulting gain signal is output at a point 472.

The on-track detector 38 receives the difference signal from the difference circuit 36. The on-track detector 38 analyzes the difference signal and if the signal is between a certain high and low voltage threshold, then an on-track four hundred eighty TPI signal is sent to controller 28 from a point 474. The on-track four hundred eighty signal means that the heads 16 are on-track in the four hundred eighty TPI position mode. The on-track detector 38 also determines if the difference signal is between a second high and low voltage threshold and if so, outputs a four hundred eighty damping signal at a point 476. The four hundred eighty damping signal is used to control a damping feature discussed below. The on-track detector 38 is comprised of a resistor 478, a resistor 480, a resistor 482, a resistor 484, a resistor 486, an amplifier 488, an amplifier 490, a resistor 492, a resistor 494, a resistor 496, a resistor 498, a resistor 500, a resistor 502, a resistor 504, an amplifier 506, an amplifier 508, a resistor 510, and an inverter 512.

The AGC 34 averages the "A" and "B" burst signals from the sample and hold circuit 32 and outputs an AGC control signal at a point 516. The AGC control signal is used by the amplifier 20 to adjust the gain of incoming signals. The AGC control 34 is comprised of a resistor 518, a diode 520, a diode 522, a resistor 524, a resistor 526, a diode 528, a resistor 530, a resistor 532, a resistor 534, an amplifier 536, a resistor 538, a resistor 540, a capacitor 542, an amplifier 544, a resistor 546, and a resistor 548.

FIG. 4 shows a circuit diagram of part of the system 10 and is designated by the general reference number 600. The slope circuit 42 receives the gain signal from point 472. The slope circuit 42 selects the slope of the gain signal by inverting one slope of the gain signal wave. The slope to be inverted is determined by controller 28. Controller 28 sends a slope signal to a point 610. Slope signal controls a switch 610 which determines which slope is inverted. For an odd numbered track, controller 28 selects one slope and for an even numbered track, controller 28 selects the other slope. Slope circuit 42 is further comprised of a resistor 614, a resistor 616, a resistor 618, an amplifier 620, and a resistor 622.

The position compensator and tilt hold circuit 44 (position circuit) receives the four hundred eighty TPI position signal from the slope circuit 42 along a line 624. The signal is passed through a resistor 626 and a switch 628. Switch 628 is controlled by an inverse four hundred eighty POSM signal received at a point 630 from controller 28. The four hundred eighty POSM signal indicates that the system 10 is in the four hundred eighty position mode. If the system 10 were in the ninety-six TPI position mode, switch 628 would be open and switch 632 would be closed. Switch 632 is controlled by an inverse ninety-six POSM signal at a point 636. If the system 10 is in the ninety-six TPI position mode, then the position compensator 44 receives the ninety-six TPI position signal from point 250 via a resistor 637.

The position compensator 44 is further comprised of a resistor 640, an amplifier 642, a diode 644, a diode 646, a resistor 648, a capacitor 650, a switch 652 and an amplifier 654. The position compensator 44 modifies the four hundred eighty TPI position signal from the slope circuit 42 or the ninety-six TPI position signal from the velocity and ninety-six TPI slope selector circuit 48 and modifies them to produce a desired position mode velocity signal at a line 656.

The position compensator 44 also has a tilt hold feature to compensate for tilt of the disk drive. When the disk drive is tilted, more force is required to be exerted by the linear motor 62 to keep the heads 16 on track. Capacitor 650 stores a charge which is a measure of the bias needed to compensate for the tilt. Capacitor 650 is charged during the initial power-up of the system 10 and is used for all three modes of operation. Switch 652 disables the tilt feature by discharging capacitor 650. Switch 652 is controlled by an inverse I-reset signal at a point 658 from controller 28. During operation, the bias on capacitor 650 is normally kept on, even when the system 10 switches between velocity (seek) and position (on-track) modes.

The integrator 50 is comprised of a resistor 660, a resistor 662, a resistor 663, an amplifier 664, a resistor 666, a resistor 668, an amplifier 670, a resistor 672, a resistor 673, an amplifier 674, a capacitor 676, a resistor 678, and a switch 680. The integrator 50 integrates the measured velocity signal from point 244 to provide information of the position movement of the heads 16 between reading of the servo sectors when the system 10 is in the four hundred eighty TPI position mode. These integrated signals are called fill-in position signals. These fill-in position signals are added to the four hundred eighty TPI position signal at a point 682. The fill-in position signal plus the last four hundred eighty TPI position signal from the last servo sector sample reading provides a good approximation of the position of the heads 16. When the servo sector is being read, the four hundred eighty TPI position signal gives the actual present location of the heads 16 and the fill-in position signal is not needed. So when the servo sector is being read, the controller 28 sends an integrator signal to a point 684 which closes switch 680 and discharges capacitor 676 and thereby disables the integrator 50.

The adder 54 is comprised of a resistor 690, a resistor 692, a resistor 694, a resistor 696 and an amplifier 698. The adder 54 takes the desired position mode velocity signal from the position compensator 44 and compares it to the measured velocity signal from the damping circuit 52. The adder 54 trys to keep the measured velocity signal equal to the desired position mode velocity by outputting an appropriate error signal at a point 700.

The damping circuit 52 is comprised of a resistor 710, a switch 712 and a switch 714. During the velocity mode, controller 28 puts out a velocity/inverse position signal at a point 716. This causes switch 714 to open and prevents the measured velocity signal from reaching adder 54. The switch 714 remains closed during a position mode.

The damping circuit 52 has a damping feature. As stated above, the adder 54 puts out an error signal which trys to equalize the measured velocity and the desired position mode velocity. However, if the heads 16 are already close to being on-track, then moving them to correct the position may cause the heads to overshoot the track. So if the heads 16 are close to being on-track, the four hundred eighty damping signal from point 476 will cause switch 712 to close and the system 10 will be overdamped. If the heads 16 are very far from the track, then the four hundred eighty damping signal will cause switch 710 to open and system 10 will be underdamped. When the heads 16 are very far off-track, the underdamped condition is necessary to allow the heads to respond quickly and move toward the track. The ninety-six POSM signal is gated with the four hundred eighty damping signal at a NOR gate 720. The system is underdamped during ninety-six TPI position mode.

The velocity compensator 56 is comprised of an inverter 722, a switch 724, a resistor 726, a resistor 728, a switch 734, a resistor 736, a switch 738, a resistor 740, a switch 742, a resistor 744, and an amplifier 746. When the system 10 is in a position mode, the switch 734 is closed and the error signal from adder 54 is output as a motor control signal to a point 750. Motor control signal goes to linear motor 62 via power amp 60. Switch 734 is controlled by the velocity/inverse position signal from point 716. If the velocity mode is on, switch 734 is open. The error signal from adder 54 then passes through resistor 736. The error signal is still used in the velocity mode because of the need for biasing from the tilt feature.

When in the velocity mode, switch 742 is closed by an inverse/velocity position signal from an inverter 751. The amplifier 746 then compares the measured velocity signal from point 244 with the desired velocity signal or DAC signal from controller 28 via point 752. The amplifier 746 puts out a motor control signal which trys to keep the measured velocity equal to the desired velocity.

If the velocity mode is seeking a track on a four hundred eighty TPI disk, then switch 724 is kept open. Switch 724 is controlled by a four hundred eighty seek signal sent from controller 28 via a point 753. The DAC signal is then passed through a resistor 728. This allows for lower head speeds when seeking a four hundred eighty TPI track. Switch 738 is closed when a servo enable signal is sent from controller 28 via point 754 and an inverter 755. When switch 738 is closed, the system 10 is disabled.

A switch 760 and a resistor 762 form an off-set network. The off-set feature is used for testing how far off-track heads 16 can be and still read the track. During testing, switch 760 is closed by an off-set enable signal from controller 28 via a line 764. The controller 28 then sends a DAC signal via point 752 through resistor 762 to add to the position signal going to the position compensator 44. By adjusting the DAC signal, the head can be off-set from the on-track position during the position mode.

FIGS. 5-7 show a flow chart of a process for automatically configuring the servo system 10 for use with different disk formats. The process is designated by the general reference number 800. Process 800 is implemented as firmware in controller 28.

A step 810 is the start of process 800. Process 800 starts when a new disk is inserted into the disk drive 10. At a step 812, the process determines whether or not the disk drive door is closed. Controller 28 receives the information from door sensor 66. If the door is not closed, then the process is started over again at step 810. If the door is closed, then controller 28 reads a track on the disk at a step 814.

At a step 816, the controller 28 determines if a servo pattern of a four hundred eighty TPI disk has been detected. Controller 28 uses the burst gate signal from decoder 30 for this step 816. If a four hundred eighty TPI servo pattern is detected, then the disk is identified as a four hundred eighty TPI disk at a step 818. The controller 28 then configures the servo system to operate the system 10 for a four hundred eighty TPI disk at a step 820. This is accomplished by outputting a four hundred eighty position mode signal. Next, the controller 28 reads an identification field of a data track at a step 822. The identification field contains information about the location of the track on which the heads are presently located.

The controller 28 then instructs the heads 16 to move to the track location of an information field at a step 824. The location of the information field is stored in the memory of the controller 28. The information field, also called a defect map, is then read at a step 826. It is then determined at a step 828 if the information field has been found. The information field contains information on the location of all of the defective sectors on the disk. The information field is also used to store information on the block size of the sectors, interleave factor and the head/cylinder skew factor of the disk. If the information field is found at step 828, then controller 28 configures itself to use the block size, interleave factor, and head/cylinder skew factor as specified by the information field at a step 830. If the information field is not found at step 828, then controller 28 goes to a default step 832. Here the controller 28 configures itself to use standard four hundred eighty TPI disk values. The block size is set to five hundred twelve bytes, the interleave factor is set to one, and the head/cylinder skew factor is set to one hundred twenty degrees. The controller 28 is now fully configured for a four hundred eighty TPI disk and can continue normal operations at a step 834.

If a four hundred eighty TPI servo pattern is not detected at step 816, then the disk is identified as a forty-eight or ninety-six TPI disk at a step 840. The controller 28 then configures the servo system to operate the servo system 10 in the ninety-six TPI mode at a step 842. This is accomplished by outputting a ninety six position mode signal. As stated above, the ninety-six TPI servo mode is used for both forty-eight and ninety-six TPI disks. The controller 28 then instructs the heads 16 to move to the center of the disk at a step 844. This position is equivalent to track 40 on a ninety-six TPI disk.

The controller 28 sets the VFO/data separator 64 to read a high data rate ninety-six TPI disk at a step 850 of FIG. 6. A high data rate ninety-six TPI disk is formatted at five hundred Kbits/sec at three hundred sixty rpm. The disk drive system 10 of the present invention rotates the disk at six hundred rpm, so the data separator 64 is set to 833.3 Kbits/sec. The controller 28 attempts to read an identification field at a step 852. The controller 28 determines at a step 854 if a successful read of an identification field has been made. If an identification field was successfully read, then the disk is determined to be a high data rate ninety-six TPI disk at a step 856. The controller 28 then sets the block size and blocks per track values as specified in the identification field and sets the tracks per surface value equal to eighty at a step 858. Eighty tracks per surface is the standard value for a high data rate ninety-six TPI disk. The controller 28 then continues normal operation at a step 860.

If the controller 28 was not successful in reading an identification field at step 854, then the disk is identified as either a low data rate ninety-six TPI disk or a forty-eight TPI disk at a step 870. The controller 28 then sets the VFO/data separator 64 to read a low data rate ninety-six TPI or forty-eight TPI disk at a step 872. Both the low data rate ninety-six TPI disk and the forty-eight TPI disks are formatted at two hundred fifty Kbits/sec at three hundred rpm. The disk drive system 10 of the present invention rotates at six hundred rpm, so the data separator 64 is set to five hundred Kbits/sec. The controller 28 again attempts to read an identification field at a step 874.

At a step 876, the controller 28 determines whether it was successful in reading an identification field. If it was successful, then at a step 880 of FIG. 7, the controller leaves the VFO/data separator 64 in its present mode. At a step 882, the controller checks the IBM compatibility switch 68 and determines whether it is on at a step 884. If switch 68 is on, then the disk is determined to be an IBM XT type forty-eight TPI disk at a step 886. The controller 28 sets the block size equal to five hundred twelve, the blocks per track equal to nine, and the tracks per surface equal to forty at a step 888. These are standard values for the IBM XT forty-eight TPI disk. The controller 28 continues normal operations at a step 890.

If the switch 68 is not on at step 884, then the disk is determined to be an NEC type low data rate ninety-six TPI disk at a step 900. The controller 28 sets the block size equal to five hundred twelve, the blocks per track equal to nine, and the tracks per surface equal to eighty at a step 902. These are standard values for an NEC low data rate ninety-six TPI type disk. The controller 28 then continues normal operation at a step 890.

Returning now to FIG. 6, if the controller 28 was not successful in reading the identification field at step 876, then the controller 28 determines if it has already moved the heads 16 six microsteps at a step 910. If not, then the controller 28 moves heads 16 one microstep at a step 912. The process 800 then returns to step 850 and the steps thereafter are repeated. The heads 16 of system 10 are able to read four hundred eighty TPI tracks and therefore, the head width is only 1/480th of an inch. It is possible that heads 16 could initially be located between a forty-eight or ninety-six TPI track and not be able to read any identification field. The forty-eight TPI tracks has a gap of unrecorded media between the tracks of less than six microsteps in width. By microstepping up to six microsteps, the process 800 insures that the heads 16 have not missed the track because of being initially located between them.

If the heads 16 have already been moved six microsteps at step 910, then the VFO/data separator 64 is left in its present mode at a step 920 of FIG. 7. The controller 28 then sets an incompatible disk error code or indication at a step 924. This informs the computer that the disk cannot be used in this disk drive. In order to provide diagnostic information to the user, the process 800 then checks the IBM compatibility switch 68 at a step 926. The controller 28 determines if the switch is on at a step 928. If the switch is on, then controller 28 sets a code or indication that the disk is a forty-eight TPI disk at a step 930. The controller 28 continues normal operation at a step 932. If the switch is not on, then the controller 28 sets a code or indication that the disk is a low data rate ninety-six TPI disk at a step 934. The controller 28 then continues normal operation at a step 932.

The present invention has been described in its preferred embodiment using 5¼ inch floppy disks. However, the present invention could also be used with 3.5 inch floppy disks. The 3.5 inch floppys also come in a variety of formats and the present invention could be used to identify a particular type of 3.5 inch floppy and configure a disk drive accordingly.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A process for identifying disks and automatically configuring a disk drive system to a variety of data disks comprising the steps of:
  a. reading a track of a disk to determine if a servo pattern is recorded on said disk;
  b. identifying said disk as an embedded servo disk if a servo pattern is detected;

c. identifying said disk as a nonembedded servo disk if no servo pattern is detected;

d. if said disk is identified as an embedded servo disk, then configuring a disk drive system for an embedded servo disk comprising moving a head to a location of an information field, attempting to read said information field and if said information field is read, then setting a block size, block interleave factor and head/cylinder skew factors as specified by said information field; and e. if said disk is identified as a nonembedded servo disk, then configuring a disk drive system for a nonembedded servo disk.

2. The process of claim 1 further comprising the steps of:

(f) if said information field is not read, then setting block size, interleave factor and head/cylinder skew factors equal to a set of standard values for an embedded servo disk.

3. A process for identifying disks and automatically configuring a disk drive system to a variety of data disks comprising the steps of:

a. reading a track of a disk to determine if a servo pattern is recorded on said disk;

b. identifying said disk as an embedded servo disk if a servo pattern is detected;

c. identifying said disk as a nonembedded servo disk if no servo pattern is detected;

d. if said disk is identified as an embedded servo disk, then configuring a disk drive system for an embedded servo disk; and e. if said disk is identified as a nonembedded servo disk, then configuring a disk drive system for a nonembedded servo disk comprising setting a data separator at a data rate for a first type of nonembedded servo disk, and attempting to read an identification field, and if said identification field is read, then identifying said disk as a first type of nonembedded servo disk.

4. The process of claim 3 further comprising the step of:

f. if said disk is identified as a first type of nonembedded servo disk, then reading an identification field and setting block size and blocks per track as specified in said identification field and setting tracks per surface equal to a standard value for a first type of nonembedded servo disk.

5. A process for identifying disks and automatically configuring a disk drive system to a variety of data disks comprising the steps of:

a. reading a track of a disk to determine if a servo pattern is recorded on said disk;

b. identifying said disk as an embedded servo disk if a servo pattern is detected;

c. identifying said disk as a nonembedded servo disk if no servo pattern is detected;

d. if said disk is identified as an embedded servo disk, then configuring a disk drive system for an embedded servo disk; and e. if said disk is identified as a nonembedded servo disk, then configuring a disk drive system for a nonembedded servo disk comprising setting a data separator at a data rate for a first and second type of nonembedded servo disk, attempting to read an idenfication field, and if said identification field is read, then identifying said disk as being either a first or a second type of nonembedded servo disk.

6. The process of claim 5 further comprising the steps of:

f. checking a compatibility switch;

g. if said compatibility switch indicates a first condition, then identifying said disk as a first type of nonembedded servo disk; and h. if said compatibility switch indicates a second condition, then identifying said disk as a second type of nonembedded servo disk.

7. The process of claim 6 further comprising the steps of:

i. if said disk is a first type of nonembedded servo disk, then setting block size, blocks per track, and tracks per surface values equal to a set of standard values for a first type of nonembedded servo disk; and j. if said disk is a second type of nonembedded servo disk, then setting block size, blocks per track and tracks per surface values equal to a set of standard values for a second type of nonembedded servo disk.

8. A process for automatically configuring a disk drive system for a variety of data disks comprising the steps of:

a. reading a track of a disk;

b. configuring a disk drive system for an embedded servo disk if a servo pattern is detected, said configuring comprising moving a head to a specific location of an information field which contains information on block size, block interleave factor and head/cylinder skew factor, attempting to read said information field, and if said information field is read, then setting values for block size, block interleave factor, and head/cylinder skew factor as specified in said information field; and c. configuring a disk drive system for a nonembedded servo disk if a servo pattern is not detected.

9. The process of claim 8 further comprising the step of:

d. if said information field is not read, then setting the block size, block interleave factor, and the head/cylinder skew factor equal to a set of standard values for an embedded servo disk.

10. A process for automatically configuring a disk drive system for a variety of data disks comprising the steps of:

a. reading a track of a disk;

b. configuring a disk drive system for an embedded servo disk if a servo pattern is detected; and c. configuring a disk drive system for a nonembedded servo disk if a servo pattern is not detected, said configuring comprising setting a data separator at a data rate for a high data rate type of nonembedded servo disk, and attempting to read an identification field, and if an identification field is read, then setting values for block size, blocks per track and blocks per surface as specified in said identification field.

11. The process of claim 10 further comprising the steps of:

d. if an identification field is not read in step (c), then setting a data separator at a data rate for a low data rate type of nonembedded servo disk, and attempting to read an identification field; and e. if an identification field is read in step (d) and if a compatibility switch indicates a first condition, then setting block size, blocks per track and tracks per surface equal to a set of standard values for a first type of low data rate type of nonembedded servo disk.

12. The process of claim 11 further comprising the step of:

f. if an identification field is read in step (d) and if said compatibility switch indicates a second condition, then setting block size, blocks per track and tracks per surface, equal to a set of standard values for a second type of low data rate type of nonembedded servo disk.

13. The process of claim 12 further comprising the steps of:

g. if an identification field is not read in step (d) and if the head has not previously been moved a predetermined number of microsteps, then moving the head one microstep and returning to step (c).

14. The process of claim 13 further comprising the step of:

h. if said predetermined number of microsteps has been taken and no identification field has been read in step (d), then transmitting an incompatible disk error message to a computer.

15. The process of claim 13 further comprising the step of:

h. if said predetermined number of microsteps has been taken and no identification field has been read in step (d) and the compatibility switch indicates a first condition, then identifying said disk as a first type of low data rate type of nonembedded servo disk.

16. The process of claim 15 further comprising the step of:

i. if said predetermined number of microsteps has been taken, no identification field has been read in step (d) and the compatibility switch indicates a second condition, then identifying said disk as a second type of low data rate type of nonembedded servo disk.

17. A process for automatically configuring a disk drive system for a variety of data disks comprising the steps of:

a. reading a track of a disk to determine whether a servo pattern exists on said disk;

b. configuring a disk drive system for positioning on an embedded servo disk if a servo pattern is detected;

c. configuring a disk drive system for positioning on a nonembedded servo disk if a servo pattern is not detected;

d. if a servo pattern is detected, then reading an identification field, moving a head to a location of an information field, attempting to read said information field, and if said information field is read, then setting values for block size, block interleave factor, and head/cylinder skew factor as specified in said information field;

e. if said information field is not read, then setting the block size, block interleave factor and head/cylinder skew factor equal to a set of standard values for an embedded servo disk;

f. if a servo pattern is not detected, then setting a data separator at a data rate for a first type of ninety-six tracks per inch disk and attempting to read an identification field; and g. if an identification field is read in step (f), then setting values for block size, blocks per track and tracks per surface as specified in said identification field.

18. The process of claim 17 further comprising the steps of:

h. if an identification field is not read in step (f) then setting said data separator at a data rate for a forty-eight tracks per inch disk and attempting to read an identification field;

i. if an identification field is read in step (h), and if a switch indicates a first condition, then setting block size, blocks per track and tracks per surface equal to a set of standard values for a forty-eight tracks per inch disk;

j. if an identification field is read in step (h), and if a switch indicates a second condition, then setting block size, blocks per track and tracks per surface equal to a set of standard values for a second type of ninety-six tracks per inch disk; and k. if an identification field is not read in step (h), and if said head has not previously been moved a predetermined number of microsteps, then moving said head one microstep and returning to step (f).

* * * * *